May 26, 1959 L. M. MORRISH 2,888,001
INDUCTION HEATING MEANS
Filed Dec. 2, 1955 2 Sheets-Sheet 1

INVENTOR.
Leonard M. Morrish
BY
L. D. Burch
ATTORNEY

United States Patent Office 2,888,001
Patented May 26, 1959

2,888,001

INDUCTION HEATING MEANS

Leonard M. Morrish, Flint, Mich., assignor to General Motors Corporation, Detroit, Mich., a corporation of Delaware Application December 2, 1955, Serial No. 550,611

16 Claims. (Cl. 123—122)

The present invention relates to internal combustion engines and more particularly to means for preheating the combustible charge for such engines by means of the engine exhaust gases.

The atomized fuel in the combustible charge for an internal combustion engine may tend to precipitate from the charge and cause improper functioning of the engine during certain operating conditions. Under such circumstances it is the practice to divert at least a portion of the engine exhaust gases through the intake manifold to preheat the combustible charge to reduce the amount of precipitation and/or cause re-evaporation of any fuel particles precipitating out of the charge. This prevents the exhaust gases flowing through the exhaust system in their usual manner and as a result, some portions of the exhaust system remain inoperative. This may increase the exhaust back pressure and reduce the engine performance. In addition there will be portions of the exhaust system which do not have any of the exhaust gases flowing therethrough. As a result such portions remain cold and corrosive substances precipitate out of the hot exhaust gases and collect therein and attack the system. This is particularly true in so-called V-type engines having a separate exhaust system for each bank of cylinders. In these engines normally an exhaust heat valve blocks the outlet from one exhaust manifold so that all of the exhaust gases are discharged from the other manifold. Thus the half of the exhaust system which serves the first bank of cylinders is entirely inoperative.

It is now proposed to provide exhaust means for heating the combustible charge in an intake manifold for an internal combustion engine in which substantially all portions of the engine exhaust system are active at all times and conversely, a minimum amount of the exhaust system will be inactive during the engine warm-up period. This is to be accomplished by providing exhaust manifolds having the passages therein grouped to form at least two separate sets of exhaust passages that are interconnected with each other for discharging the exhaust gases through a common outlet. A temperature responsive heat valve may be disposed in one or more of these sets of exhaust passages and when the engine is below normal operating temperatures, the exhaust gases in that set will be backed up through the intake manifold to heat the charge. The exhaust gases will then flow into another set of exhaust passages and leave through the outlet for that set. By properly arranging these sets and the heat valves, the exhaust gases will always be flowing into all parts of the exhaust system. In the present instance this invention is particularly adapted for use on a V-type engine having a separate exhaust manifold for each bank of cylinders and an intake manifold having a pair of separated heating passages in heat exchanging relation with the induction passages. Each of the exhaust manifolds includes two separate sets of exhaust passages. Each of the heating passages interconnects one set of exhaust passages with another set to form two separate groups of passages, each of which has separate outlets at their opposite ends so that the exhaust gases may flow from the opposite ends thereof. Each of these groups may have a heat valve disposed in one of its outlets to block the outlet and force all of the exhaust gases to flow through the other outlet. Thus when the engine is cold the valves will be closed and the exhaust gases from the groups will be discharged from but a single outlet for each group. However, if these outlets are interconnected with separate portions of the exhaust system, all portions of the system will always be active.

Figure 1:
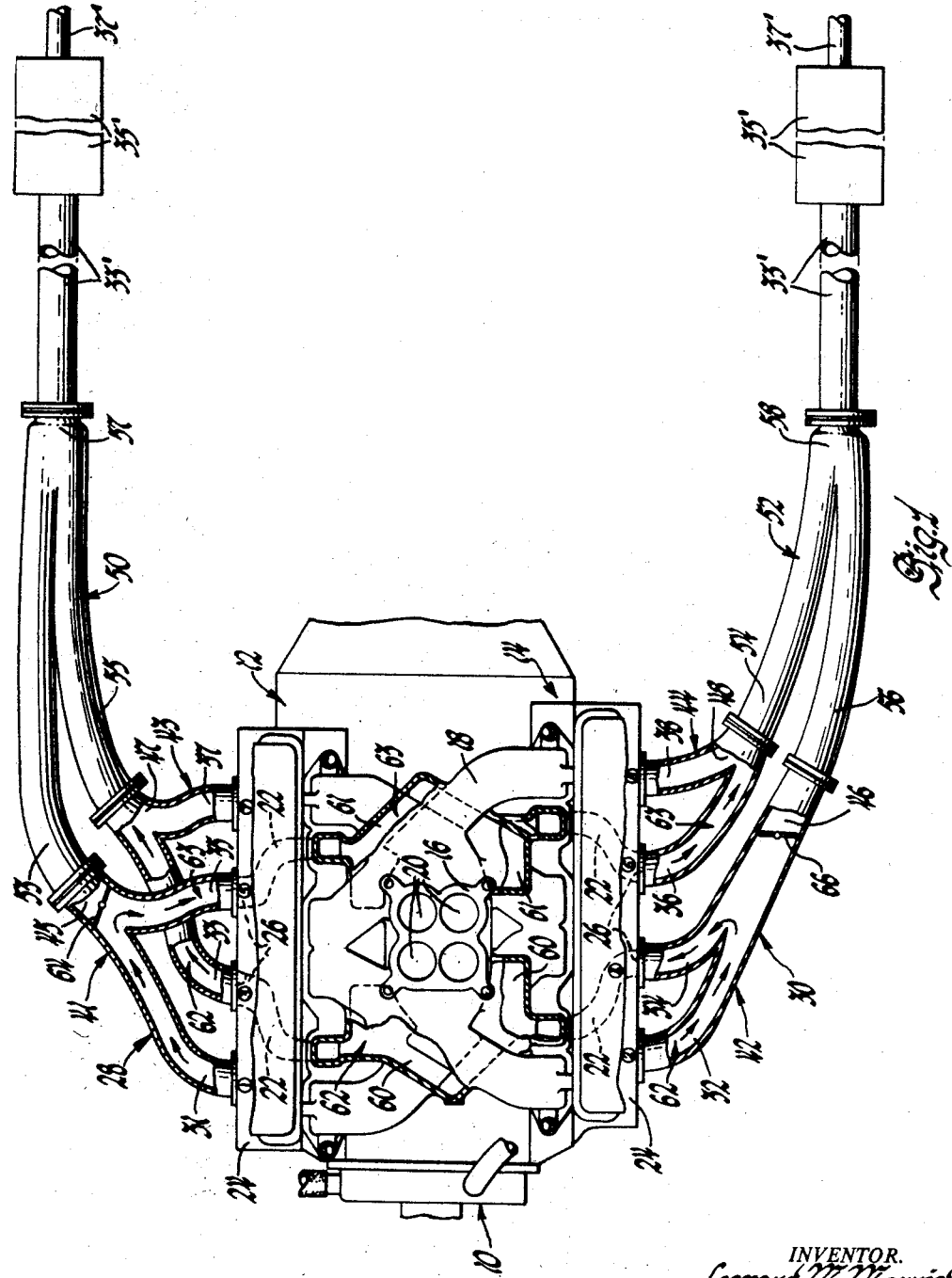
Figure 1 is a plan view of an engine embodying the present invention with portions thereof being broken away to more clearly illustrate the invention.

Referring to the drawings in more detail the present invention may be adapted for use on any suitable internal combustion engine 10. However in the present instance the engine 10 is of the so-called V-type having two angularly disposed banks 12 and 14 of cylinders. The charge for the cylinders may be formed by any suitable carburetor which is mounted on a carburetor riser 16 in a middle of an intake manifold 18 disposed between the two banks 12 and 14 of cylinders. The charge from the carburetor may flow through the riser passages 20 and into the various distribution passages in the intake manifold 18 so as to be distributed to the various cylinders of the engine 10. After the charge has been burned in the cylinders the exhaust gases therefrom may flow through exhaust passages 22 in the cylinder heads 24 and be discharged from exhaust ports 26 in the outer sides of the heads 24. A separate exhaust manifold 28 and 30 may be provided on each side of the engine 10 to collect the exhaust gases from these ports 26 and direct them through the exhaust pipes 33', mufflers 35', tail pipes 37' etc. on the opposite sides of the engine 10.

Although these exhaust manifolds 28 and 30 may be of any desired design, in the present instance they are essentially the same as disclosed and claimed in copending patent application Exhaust Manifolding System, Serial No. 511,970, filed May 31, 1955, in the name of Joseph D. Turlay, now abandoned.

Each of these exhaust manifolds 28 and 30 includes a plurality of exhaust passages 31, 32, 33, 34, 35, 36, 37 and 38 that are arranged to form separate sets 41, 42, 43 and 44 of exhaust passages that may be described as Y-shaped. Each of these sets 41, 42, 43 and 44 includes exhaust passages that communicate with the exhaust ports and a single outlet 45, 46, 47 and 48 that is adapted to be interconnected with the outlet for the other set of exhaust passages in that manifold. If the cylinders are numbered starting at the right front and proceeding from one bank to the other toward the rear, the cylinders in the right bank will be 1, 3, 5 and 7 and those in the left bank 2, 4, 6 and 8. In the embodiment shown in Figure 1 the left exhaust manifold 30 includes a front set 42 connected to cylinders 2 and 4 and a rear set 44 connected to cylinders 6 and 8. The right manifold 28 includes a front set 41 connected to cylinders 1 and 5 and a rear set 43 that overlaps the front set 41 to be connected to cylinders 3 and 7. Thus if a firing order of 1, 2, 7, 8, 4, 5, 6 and 3 is employed, the firing order in the left bank will be 2, 8, 4 and 6 and the firing order in the right bank will be 1, 7, 5 and 3 and there will be substantially no overlapping of the exhaust periods of any of the cylinders firing into the same set and the back pressure will be reduced to a minimum. Of course it should be understood that these sets may be arranged and interconnected with the cylinders and each other in any desired manner.

The outlets for each of these sets of exhaust passages may be connected with the other outlet for the other set in the same manifold. As seen in Figure 1 this is accomplished by adaptors 50 and 52 having a pair of inlets 53, 54, 55 and 56 and a single flanged outlet 57 and 58 that is connected to an exhaust pipe, muffler, etc. Thus the exhaust gases for each bank may flow into the exhaust manifold on that bank, through the outlets 44 to 47 from the sets and into the exhaust pipes, etc. on that side.

In order to heat the charge flowing therethrough, the intake manifold 18 may have one or more heating passages 60 and 61 that extend therethrough in heat exchanging relation with the induction passages. In the embodiment illustrated in Figure 1, this intake manifold 18 is substantially identical to the one disclosed in patent application Inlet Manifold System, Serial No. 320,519, filed November 14, 1952 in the name of Joseph D. Turlay, now U.S. Patent No. 2,725,047 issued Nov. 29, 1955. The intake manifold 18 may include any suitable network of induction passages for deliverying the charge to the cylinders of the engine and the heating passages 60 and 61 may be disposed in any desired heat exchanging relation with the induction passages and the charge therein. There are two separate and independent heating passages 60 and 61 that extend transversely through the manifold 18. Each of the cylinder heads 24 may have at least a pair of exhaust passages 22 that extend completely therethrough. Thus the outer ends of each of these passages 22 will communicate with one of the sets 41, 42, 43 or 44 of exhaust passages in the exhaust manifolds 28 or 30 and an end of a heating passage 60 or 61 in the intake manifold 18. It may thus be seen that a set of exhaust passages on one side will be interconnected with another set on the other side of the engine to form groups of passages with each group having an outlet on each side of the engine. More particularly, one group 62 will include the front set 42 of exhaust passages on the left side, the front heating passage 60 and the rear set 43 on the right side while the other group 63 includes the left rear set 44, the rear heating passage 61 and the right front set 41.

In order to divert the hot exhaust gases through the heating passages 60 and 61, a heat valve 64 and 66 may be provided in the outlets 45 and 46 to the sets 41 and 42 of passages to prevent the flow of exhaust gases therepast. These heat valves 64 and 66 which may be of any suitable design such as the so-called butterfly type are preferably disposed on opposite sides of the engine 10. In the present instance these valves are located in the outlets 45 and 46 for the right front and left front sets 41 and 42 of exhaust passages, but, of course, they may be disposed at numerous other locations. Any suitable means such as a thermostat responsive to the temperature of the engine may be employed for opening and closing the valves.

If the engine is cold the heat valves 64 and 66 will be closed. Thus all of the exhaust gases in the left front set 42 of passages will be blocked from leaving that outlet 46 and will thus flow through the front heating passage 60 and into the right rear set 43 from which it may flow through outlet 47 into the right exhaust pipe. At the same time the exhaust gases in the right front set 41 will be blocked by the heat valve 64 and will thus flow through the rear heating passage 61 and into the rear set 44 of passages and through the outlet 48 into the left exhaust pipe. Accordingly, there will be hot exhaust gases flowing through substantially all parts of the exhaust system even though the heat valves 64 and 66 are closed.

As soon as the engine 10 heats up the thermostats will open the heat valves 64 and 66 and allow the exhaust gases in each set of exhaust passages to flow directly through its outlet into the exhaust pipes. It is therefore apparent that irrespective of whether or not the heat valves are open or closed there will always be a flow of hot exhaust gases through all portions of the exhaust system.

Figure 2:
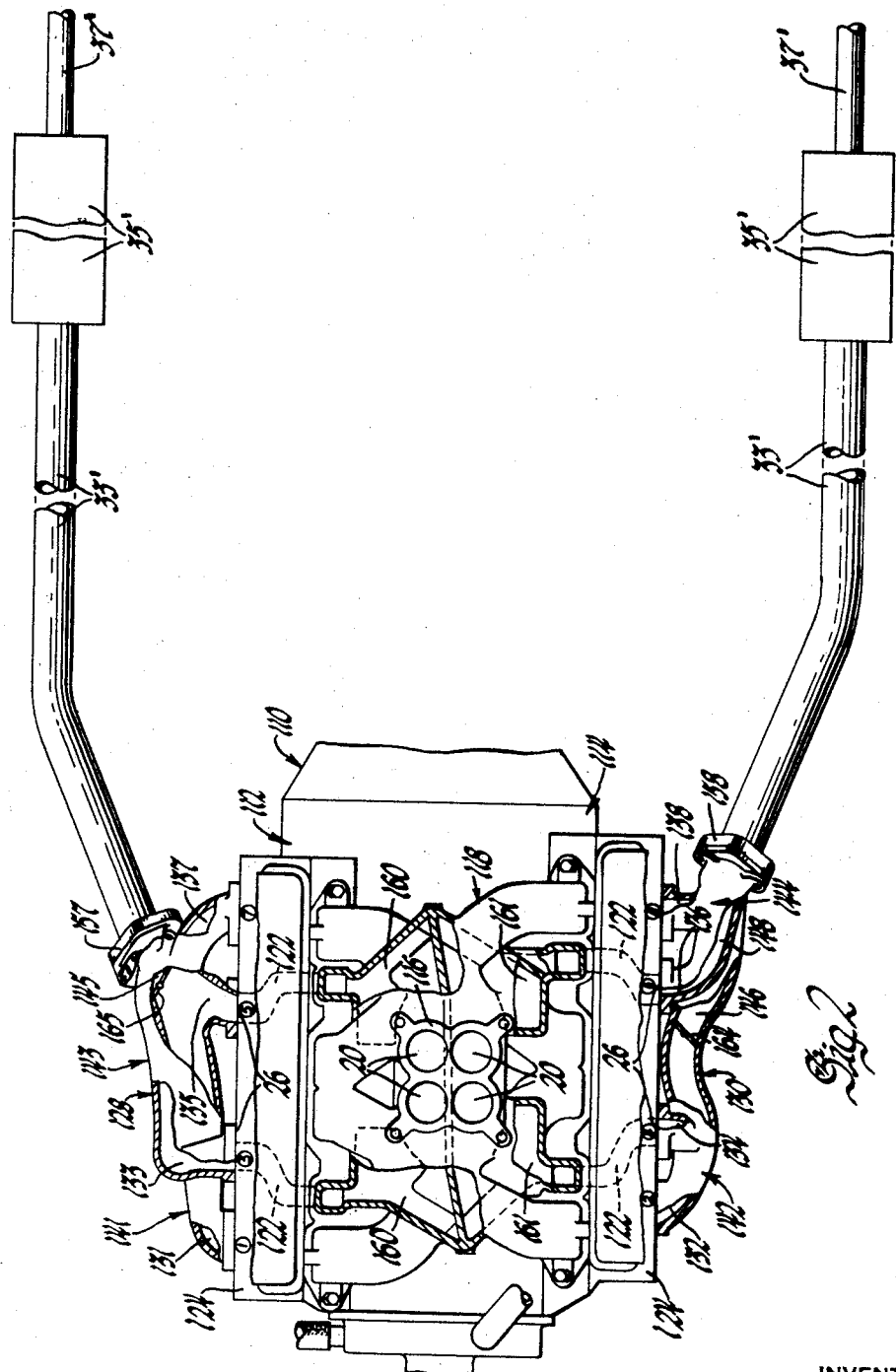
Figure 2 is a plan view similar to Figure 1 but showing a modification of the present invention.

The embodiment shown in Figure 2 is essentially the same as the first embodiment. An intake manifold 118 is disposed between the two banks 112 and 114 of cylinders and includes a carburetor riser 116 and distribution passages the same as in the preceding embodiment. In addition, exhaust manifolds 128 and 130 are located on the opposite sides of the engine 110 for collecting the exhaust gases and directing them through the exhaust pipes.

Each of the exhaust manifolds 128 and 130 are cast as one member so as to include separate sets 141, 142, 143 and 144 of exhaust passages 131, 132, 133, 134, 135, 136, 137 and 138, each of which has an outlet 145, 146, and 148 intersecting the outlet for the other set adjacent the outlet 157 and 158 for that manifold. More particularly, the left manifold 130 includes a front set 142 of exhaust passages 132 and 134 which communicate with cylinders 2 and 4 and has a single outlet 146 and a rear set 144 which communicates with cylinders 6 and 8 and has a single outlet 148. These two outlets 146 and 148 communicate with each other immediately adjacent the manifold outlet 158 so that a single exhaust pipe may be connected directly thereto. The right manifold 128 also includes a front set 141 of exhaust passages 131 and 135 communicating with cylinder 1 and the cylinder 5 and including a single outlet 145. The rear set 143 of exhaust passages 133 and 137 overlaps the front set 141 and communicates with cylinders 3 and 7 and has a single outlet 145. Although both of these sets 141 and 143 of exhaust passages have separate outlets 145, they are interconnected with each other to form a single outlet 157 from the exhaust manifold 128.

The intake manifold 118 includes a pair of heating passages 160 and 161 that extend longitudinally of the intake manifold 118 in heat exchanging relation with the distribution passages. The opposite ends of these heating passages 160 and 161 form ports in the sides of the intake manifold 118 positioned to communicate with the exhaust passages 122 in the cylinder heads 124. Thus the heating passages on each side of the engine will interconnect the two sets of exhaust passages on the same side of the engine with each other.

Heat valves 164 and 165 may be provided in each exhaust manifold 128 and 130 for controlling the flow of exhaust gases therefrom. These heat valves 164 and 165 are preferably mounted in the outlet for one of the sets of passages so that the other set will have an unobstructed outlet.

When the engine 110 is cold the valves 164 and 165 will be closed. Thus the exhaust gases in the front sets 141 and 142 of passages will be diverted through the cylinder heads and into the longitudinal passages 160 and 161 in the intake manifold 118 where it will heat the induction passages and the charge therein. The exhaust gases will then leave the ends of the heating passages 160 and 161 and flow into the other set of exhaust passages 122 from whence it will flow directly into the exhaust pipe on that side of the engine 110.

It will be seen that at all times the exhaust gases developed on one side of the engine will always remain on that side and be discharged through the exhaust pipes on the same side. Thus irrespective of whether or not the heat valves 64 and 65 and 164 and 165 are opened or closed, there will always be a substantial flow of hot exhaust gases through all portions of the exhaust system at all times.

It is to be understood that, although the invention has been described with specific reference to particular embodiments thereof, it is not to be so limited since changes and alterations therein may be made which are within the full intended scope of this invention as defined by the appended claims.

I claim:

1. In an engine having a pair of angularly disposed banks of cylinders and having an intake manifold disposed therebetween with induction passages charging said cylinders and a pair of heat passages extending therethrough in heat exchanging relation with said induction passages, a separate exhaust manifold for each bank of cylinders disposed on the opposite sides of the engine for discharging the exhaust gases into the atmosphere, each of said exhaust manifolds including a pair of separate sets of exhaust passages, each of said sets communicating with one of the heat passages in said intake manifold and including an outlet interconnected with the outlet for the other set of exhaust passages in that exhaust manifold, an exhaust heat valve in each of said exhaust manifolds located in one of said sets of exhaust passages adjacent the outlet thereof.

2. In an engine having a cylinder block with a pair of angularly disposed banks of cylinders and an intake manifold disposed therebetween with induction passages for charging said cylinders, a separate exhaust manifold for each bank of cylinders disposed on the opposite sides of the engine for collecting and discharging the engine exhaust gases into the atmosphere, each of said exhaust manifolds including a pair of separate sets of exhaust passages, each of said sets including an outlet interconnected with the outlet for the other set of passages in that exhaust manifold, a pair of heat passages in said intake manifold in heat exchanging relation with said induction passages, each of said heat passages interconnecting one of said sets of exhaust passages with another set to form a group of passages, a separate exhaust heat valve for each of said groups of passages, said heat valves being disposed in a separate exhaust manifold adjacent the outlet of one of said sets of passages.

3. In an engine having a pair of angularly disposed banks of cylinders and an intake manifold disposed therebetween with induction passages for charging said cylinders and a pair of separate heat passages extending transversely therethrough in heat exchanging relation with said induction passages, a separate exhaust manifold for each bank of cylinders disposed on the opposite sides of the engine for discharging the exhaust gases into the atmosphere, each of said exhaust manifolds including a pair of separate sets of exhaust passages, each of said sets communicating with an end of one of the transverse heat passages in said intake manifold and including an outlet interconnected with the outlet for the other set of passages in that exhaust manifold, an exhaust heat valve in each of said exhaust manifolds located in one of said sets of passages adjacent the outlet therefor.

4. In an engine having a pair of angularly disposed banks of cylinders and having an intake manifold disposed therebetween with induction passages for charging said cylinders and a pair of heat passages extending longitudinally therethrough in heat exchanging relation with said induction passages so that each of said heat passages will form ports on the sides of said intake manifold, a separate exhaust manifold for each bank of cylinders disposed on the opposite sides of the engine for discharging the exhaust gases into the atmosphere, each of said exhaust manifolds including a pair of separate sets of exhaust passages, each of said sets having a portion thereof communicating with a port for one of said heat passages in said intake manifold and including an outlet interconnected with the outlet for the other set of exhaust passages in that exhaust manifold, an exhaust heat valve in each of said exhaust manifolds located in one of said sets of exhaust passages adjacent the outlet therefor.

5. In an engine having a cylinder block with a pair of angularly disposed banks of cylinders and an intake manifold disposed therebetween with induction passages for charging said cylinders, a separate exhaust manifold for each bank of cylinders disposed on the opposite sides of the engine for collecting and discharging the engine exhaust gases into the atmosphere, each of said exhaust manifolds including a pair of separate sets of exhaust passages, each of said sets including an outlet interconnected with the outlet for the other set of passages in that manifold, a pair of heat passages in said intake manifold in heat exchanging relation with said induction passages, each of said heat passages extending transversely of said intake manifold and being interconnected with one of said sets of exhaust passages in each of said exhaust manifolds to form two separate groups of passages, a separate exhaust heat valve for each of said groups of passages, said heat valves being disposed on opposite sides of said engine adjacent the outlet for one of said sets of passages in each of said groups.

6. In an engine having a cylinder block with a pair of angularly disposed banks of cylinders and an intake manifold disposed therebetween with induction passages for charging said cylinders, a separate exhaust manifold for each bank of cylinders disposed on the opposite sides of said engine for collecting and discharging the engine exhaust gases into the atmosphere, each of said exhaust manifolds including a pair of separate sets of exhaust passages, each of said sets including an outlet interconnected with the outlet for the other set of passages in that exhaust manifold, a pair of independent heat passages extending longitudinally of said intake manifold in heat exchanging relation with said induction passages to form ports on the opposite sides of said intake manifold, each of said ports being interconnected with one of said sets of exhaust passages to form separate groups of passages on the opposite sides of the engine, a separate exhaust heat valve for each of said groups of passages disposed in separate exhaust manifolds adjacent the outlets of said sets of passages.

7. An exhaust manifold for an internal combustion engine, said exhaust manifold comprising a member having a plurality of exhaust passages for collecting the exhaust gases from said engine and discharging them into the atmosphere, said exhaust passages being divided into two separate sets with each of said sets having an outlet to be interconnected with the outlet for the other set, and a heat valve in one of said sets disposed adjacent the outlet for that set for blocking said outlet and effectively isolating one of said sets from the other of said sets.

8. An exhaust manifold adapted to be one of a pair of similar exhaust manifolds employed on an internal combustion engine having a pair of angularly disposed banks of cylinders with an intake manifold disposed therebetween, said exhaust manifold comprising a member having a plurality of exhaust passages for collecting the exhaust gases from said engine and discharging them into the atmosphere, said exhaust passages being divided into two separate sets with each of said sets having an outlet to be interconnected with the outlet for the other set, and a heat valve in one of said sets disposed adjacent the outlet for that set for blocking said outlet and effectively isolating one of said sets from the other of said sets for diverting the exhaust gases in that set through a heat passage in the intake manifold.

9. In an engine having a pair of angularly disposed banks of cylinders with an intake manifold disposed between said banks and having induction passages for charging said cylinders, an exhaust system for collecting the exhaust gases from said engine and dissipating them into the atmosphere, said exhaust system including a separate exhaust manifold for each bank of cylinders, each of said exhaust manifolds having separate sets of exhaust passages therein adapted to be interconnected with said cylinders, each of said sets of exhaust passages being independent from the other of said sets and having an outlet adapted to be interconnected with the outlet for the other set in that exhaust manifold for discharging the exhaust gases through a common exhaust conduit, a heat valve in the outlet for one of said sets for blocking said outlet for diverting the exhaust gases from that set through a heat passage in said intake manifold so as to heat the charge in said induction passages.

10. In an engine having a pair of angularly disposed banks of cylinders with an intake manifold disposed between said banks and having induction passages for charging said cylinders, an exhaust system for collecting the exhaust gases from said engine and dissipating them into the atmosphere, said exhaust system including a separate exhaust manifold for each bank of cylinders, each of said exhaust manifolds having separate sets of exhaust passages therein adapted to be interconnected with said cylinders, each of said sets of exhaust passages having an outlet adapted to be interconnected with an outlet for the other set in that exhaust manifold for discharging the exhaust gases through a common exhaust conduit, a pair of passages extending transversely through said intake manifold in heat exchanging relation with said induction passages and interconnecting one of said sets on one side of said engine with another set on the opposite side of said engine, a heat valve in the outlet for one of said sets for blocking said outlet for diverting the exhaust gases from that set through said heating passage to heat the charge in said induction passage.

11. In an engine having a pair of angularly disposed banks of cylinders with an intake manifold disposed between said banks and having induction passages for charging said cylinders, an exhaust system for collecting the exhaust gases from said engine and dissipating them into the atmosphere, said exhaust system including a separate exhaust manifold for each bank of cylinders, each of said exhaust manifolds having separate sets of exhaust passages therein adapted to be interconnected with said cylinders, each of said sets of exhaust passages having an outlet adapted to be interconnected with an outlet for the other set in that exhaust manifold for discharging the exhaust gases through a common exhaust conduit, a pair of heating passages extending longitudinally of said intake manifold in heat exchanging relation with said induction passages and interconnecting one set of passages with the other set of passages on the same side of the engine, a heat valve in the outlet for one of said sets for blocking said outlet for diverting the exhaust gases from that set through one of said heat passages so as to heat the charge in said induction passages.

12. In an engine having a pair of angularly disposed banks of cylinders and an intake manifold disposed therebetween with induction passages for charging said cylinders and a pair of separate heat passages extending transversely therethrough in heat exchanging relation with said induction passages, a separate exhaust manifold for each bank of cylinders disposed on the opposite sides of the engine for discharging the exhaust gases into the atmosphere, each of said exhaust manifolds including a pair of separate sets of exhaust passages, each of said sets communicating with an end of one of the transverse heat passages in said intake manifold and including an outlet interconnected with the outlet for the other set of passages in that exhaust manifold, an exhaust heat valve in each of said exhaust manifolds located in one of said sets of passages adjacent the outlet therefor, temperature responsive means responsive to the temperature of said engine for actuating said heat valves whenever said engine is operating at subnormal temperatures.

13. In an engine having a cylinder block with a pair of angularly disposed banks of cylinders and an intake manifold disposed therebetween with induction passages for charging said cylinders, a separate exhaust manifold for each bank of cylinders disposed on the opposite sides of said engine for collecting and discharging the exhaust gases into the atmosphere, each of said exhaust manifolds including a pair of separate sets of exhaust passages, each of said sets including an outlet interconnected with the outlet for the other set of passages in that exhaust manifold, a pair of independent heat passages extending longitudinally of said intake manifold in heat exchanging relation with said induction passages to form ports on the sides of said intake manifold, each of said ports being interconnected with one of said sets of exhaust passages to form separate groups of passages on the opposite sides of said engine, a separate exhaust heat valve for each of said groups of passages disposed in said exhaust manifolds adjacent the outlets of said sets of passages and means responsive to the temperature of said engine for closing said valve when said engine is operating at subnormal temperatures to thereby divert the exhaust gases from one set through the longitudinal passage and into the other set.

14. An exhaust manifold adapted to be one of a pair of similar exhaust manifolds employed on an internal combustion engine having a pair of angularly disposed banks of cylinders with an intake manifold disposed therebetween, said exhaust manifold comprising a member having a plurality of exhaust passages for collecting the exhaust gases from said engine and discharging them into the atmosphere, said exhaust passages being divided into two separate sets with each of said sets having an outlet to be interconnected with the outlet for the other set, and a heat valve in one of said sets disposed adjacent the outlet for that set for blocking said outlet and effectively isolating one of said sets from the other of said sets for diverting the exhaust gases in that portion through a heat passage in said intake manifold, and temperature responsive means sensitive to the temperature of said exhaust manifold for opening said heat valve whenever the temperature of said manifold exceeds some predetermined amount.

15. The combination of an engine having a cylinder block with a pair of angularly disposed banks of cylinders, an intake manifold disposed between said banks and having induction passages for charging said cylinders, exhaust manifolds on the opposite sides of said engine, each of said exhaust manifolds including a front and rear set of exhaust passages which are interconnected with said cylinders for collecting the exhaust gases therefrom, a pair of heating passages extending transversely through said intake manifold for interconnecting the front set on one side with the rear set on the opposite side so as to form a group of passages having outlets on both sides of said engine, the outlets on the same sides being adapted to be interconnected with each other for discharging the exhaust gases through a common exhaust system on that side, a valve on one side of said engine disposed in the outlet for one of said groups and a heat valve on the opposite side of said engine disposed in an outlet for the other of said groups.

16. The combination of an engine having a cylinder block with a pair of angularly disposed banks of cylinders, an intake manifold disposed between said banks and having induction passages therein for charging said cylinders, exhaust manifolds on the opposite sides of said engine for discharging the exhaust gases into the atmosphere, each of said exhaust manifolds having exhaust passages interconnected with said cylinders to form a pair of independent sets of exhaust passages in each of said exhaust manifolds, a pair of heating passages extending through said intake manifold in heat exchanging relation with said induction passages, each of said heating passages interconnecting one set with another set so as to form two separate groups with each of said groups of passages having two outlets, each of said groups including a heat valve disposed in one of said outlets for blocking that outlet and causing the exhaust gases in one of the sets of passages in that group to be diverted through the heat passage in that group and into the other set of passages in that group so as to be discharged through the other outlet for that group.

References Cited in the file of this patent

UNITED STATES PATENTS

| | | |
|---|---|---|
| 2,523,611 | Clayton | Sept. 26, 1950 |
| 2,603,199 | Moseley | July 15, 1952 |